United States Patent

Cagle et al.

[11] 4,216,543
[45] Aug. 5, 1980

[54] MEANS FOR DERIVING BAUD TIMING FROM AN AVAILABLE AC SIGNAL

[75] Inventors: George C. Cagle, Plano; Roger A. Bloom, Garland, both of Tex.

[73] Assignee: Rockwell International Corporation, El Segundo, Calif.

[21] Appl. No.: 15,014

[22] Filed: Feb. 26, 1979

[51] Int. Cl.³ .................. H04L 27/32; H03D 3/22
[52] U.S. Cl. ........................ 375/95; 375/119; 340/310 A
[58] Field of Search ............ 307/210; 328/133, 134, 328/140; 329/104, 105, 107; 364/111, 484, 485, 701, 702, 703; 340/170, 310 A; 325/320; 178/66 R, 88, 69.1; 179/15 BT; 375/80, 82, 86, 94, 95, 119

[56] References Cited

U.S. PATENT DOCUMENTS

| | | | |
|---|---|---|---|
| 3,830,980 | 8/1974 | Peron et al. | 179/15 BT |
| 3,922,534 | 11/1975 | Gerstenmeier et al. | 364/484 |
| 4,088,957 | 5/1978 | Perkins | 178/88 |

Primary Examiner—Benedict V. Safourek
Attorney, Agent, or Firm—Howard R. Greenberg; H. Fredrick Hamann

[57] ABSTRACT

Baud timing is derived from an AC signal having n half-cycles during each baud period, for use in demodulating a carrier signal bearing digital information via some predetermined variation in a characteristic of the carrier signal during each baud period, by converting the carrier signal characteristic variation to a DC signal, sampling the DC signal at the same point during each half-cycle of the AC signal, summing the samples corresponding to the same half-cycle of the AC signal within each sequence of AC signal half-cycles occurring over successive baud periods, there being n such sample totals, identifying the largest one of the n totals and sychronizing the baud timing signal to the AC half-cycle corresponding thereto.

19 Claims, 14 Drawing Figures

| ZERO CROSSING SEQUENCE | FIRST | SECOND | THIRD | FOURTH | FIFTH | SIXTH ← ZERO CROSSING SAMPLE |
| --- | --- | --- | --- | --- | --- | --- |
| FIRST → | $Sa_{11}$ | $Sa_{12}$ | $Sa_{13}$ | $Sa_{14}$ | $Sa_{15}$ | $Sa_{16}$ |
| SECOND → | $Sa_{21}$ | $Sa_{22}$ | $Sa_{23}$ | $Sa_{24}$ | $Sa_{25}$ | $Sa_{26}$ |
|  | ------ | ------ | ------ | ------ | ------ | ------ |
| $m^{th}$ → | $Sa_{m1}$ | $Sa_{m2}$ | $Sa_{m3}$ | $Sa_{m4}$ | $Sa_{m5}$ | $Sa_{m6}$ |
|  | $\Sigma Sa_1$ | $\Sigma Sa_2$ | $\Sigma Sa_3$ | $\Sigma Sa_4$ | $\Sigma Sa_5$ | $\Sigma Sa_6$ ← ZERO CROSSING SAMPLES TOTALS |

FIG. 6

MEANS FOR DERIVING BAUD TIMING FROM AN AVAILABLE AC SIGNAL

BACKGROUND OF THE INVENTION

The invention herein pertains generally to digital communications and specifically to the establishment of proper symbol timing requisite to the detection of baud values where the data bauds are conveyed by AC carrier signal.

The transmission of digital data by varying some characteristic of an AC carrier signal, such as its phase or frequency, commonly referred to as phase shift and frequency shift keying, respectively, is widely practiced. Intrinsic to this mode of communications is the need to establish appropriate symbol (also referred to as baud) timing at the receiver to identify the beginning and termination of each baud period, wherein a single unit of data comprising one or more data bits is transmitted, to permit the detection thereof. As is well documented in the technical literature, including U.S. Pat. No. 3,368,036 entitled "Demultiplexing and Detecting System for Predicted Wave Phase Pulse Data Transmission System" owned by the same assignee herein, a common technique to detect the value of each data baud is one known as "integrate and dump" wherein a signal is allowed to linearly vary over the baud period with a polarity which is a function of the carrier signal characteristic vis-a-vis some reference signal, thereby defining the baud value. The efficacy of this detection technique is based on encompassing each integration period within the associated transmitted baud period so that it does not overlap into the next baud period, and consequently the need for developing appropriate symbol timing in the receiver.

One conventional method for affording appropriate symbol timing is to transmit along with the carrier signal a pilot tone so that the receiver timing can be synchronized to that employed in the transmitter. In some communications media, however, this tone and its associated hardware can be eliminated by employing a synchronizing signal which is intrinsically available at both the transmitter and receiver. For example, in the evolving technical field of power line communications for permitting electric utility companies to transmit communication signals over their distribution power lines to remotely control customer loads and monitor energy consumption, symbol timing can be derived from the 60 hertz power system itself since the transmitter and receiver are both connected thereto. Relying on the 60 hertz power signal as a synchronizing agent, however, creates a problem in selecting the proper cycle during a given baud period as well as the point of the AC cycle to which to synchronize. Since the zero crossing of an AC signal is the most discernible and therefore most logical point to which to synchronize, this is the common practice. However, ambiguities arise, the severity of which is dependent on the baud rate. As an example, if one were to transmit at a data rate of 60 baud/second, there would be one 60 hertz AC cycle and concomitantly two zero crossings per baud between which to choose for synchronization. At a lower rate, for instance 20 baud/second, there would be three 60 hertz AC cycles and concomitantly six zero crossings per baud to contend with. If the integration period corresponding to an individual baud were to be initiated on the wrong zero crossing, it then would overlap into the consecutive baud period, rendering it more difficult to accurately detect data by adding to or subtracting from the integrated value which would have been obtained if the integration had been initiated at the right zero crossing.

In view of the foregoing, it is an object of the present invention to provide a new and improved means for deriving symbol timing from an available AC signal for detecting digital data conveyed by the varying characteristic of a carrier signal where symbol timing itself is synchronized to the AC signal.

It is a further object of the present invention to provide such a new and improved means which obviates ambiguities encountered when deriving the symbol timing from the AC signal having multiple zero crossings during each baud period.

It is still a further object of the present invention to provide such a new and improved means which may be digitally implemented so as to realize the economic benefits of large scale integration techniques.

The foregoing objects, as well as others, and the means by which they are achieved through the present invention may best be appreciated by referring to the Detailed Description of the Preferred Embodiment which follows together with the appended drawings.

SUMMARY OF THE INVENTION

In accordance with the foregoing objects, the subject invention derives a baud timing signal from an AC signal to which the baud timing of the transmitted carrier signal is synchronized having n zero crossings during each baud period. Each zero crossing of the AC signal is examined at the receiver to determine the likelihood that it was the one to which the carrier signal was synchronized. This is accomplished by converting the carrier signal characteristic which is varied during each baud period in accordance with the digital information, for example, phase angle, to a DC signal and then sampling the DC signal, preferably after it has been integrated over a time equal to one baud period beginning with each zero crossing, for each of the zero crossings. Each sample is stored so that it can be summed with other like samples corresponding to the same zero crossing location within a sequence of zero crossings during a single baud period, thus affording more than one baud period on which to determine the proper zero crossing for baud timing synchronization. The resulting n samples totals for the n zero crossings are then compared to determine which is the largest since the correct zero crossing will yield the maximum samples. Once the largest summation is identified, the zero crossing associated therewith is selected as the one to which to synchronize the baud timing signal.

To enhance the efficacy of the baud timing signal derivation herein, the invention employs features which reject spurious signals such as noise, thus optimizing the recognition of a valid data signal. These features include ignoring samples which fall below a minimum threshold, considered as possible noise, while rejecting in its entirety all of the extant samples prior to their summation and comparison for zero crossing identification any time that a sample exceeds a maximum threshold, to avoid non-linear saturation effects. Also, no single sequence of samples over a single baud period is accepted unless some minimum member of valid samples within the sequence is detected. An additional safeguard is the requirement that the same zero crossings be identified twice consecutively before it is accepted as a valid zero crossing for synchronization.

BRIEF DESCRIPTION OF THE DRAWINGS

FIG. 6 is a mathematical matrix representation expository of the invention.

DETAILED DESCRIPTION OF THE PREFERRED EMBODIMENT

Only for purposes of exemplification, the subject invention will be described in connection with a commercial communications system developed by the assignee herein known as Kineplex which entails transmitting digital data via a carrier signal employing $4\phi$ differential phase keying (DPSK) so that two bits of data correspond to each baud period and the phase of the carrier signal acts as a reference for the consecutive baud period. This system is described at length in U.S. Pat. No. 3,368,036, previously alluded to, and therefore will be treated only briefly herein as is necessary to afford an understanding of the subject invention. Also, once again only for exemplary purposes, the invention will be described in conjunction with a partial integration technique specifically addressed by a copending application Ser. No. 015,276 entitled "Means for Subdividing a Baud Period into Multiple Integration Intervals to Enhance Digital Message Detection" owned by the assignee herein.

As delineated in the U.S. Pat. No. 3,360,036, the phase angle of a carrier signal is advanced 45° or some odd multiple thereof during each baud period from the previous baud period, with the change being dependent on which one of the four combinations of two binary data bits is engendered in the digital information to be transmitted during that period. The data contained in the baud period is detected as the receiver by mixing with the carrier signal two AC signals of like frequency equal to that of the carrier, but differing in phase angle by 90°, which produces two output signals having respective DC components whose polarities are a function of the sine of the carrier phase angle, when referenced to some fixed angle for one of the signals (quadrature component) and its cosine for the other signal (in phase component). These signals are separately integrated over the baud period, at the end of which they are combined with their counterparts for the previous baud period to yield the in phase (cosine) and quadrature phase (sine) components of the phase difference in the carrier signal between two consecutive baud periods which then defines the two data bit values by virtue of the respective trigonometric signs.

Figure 1:
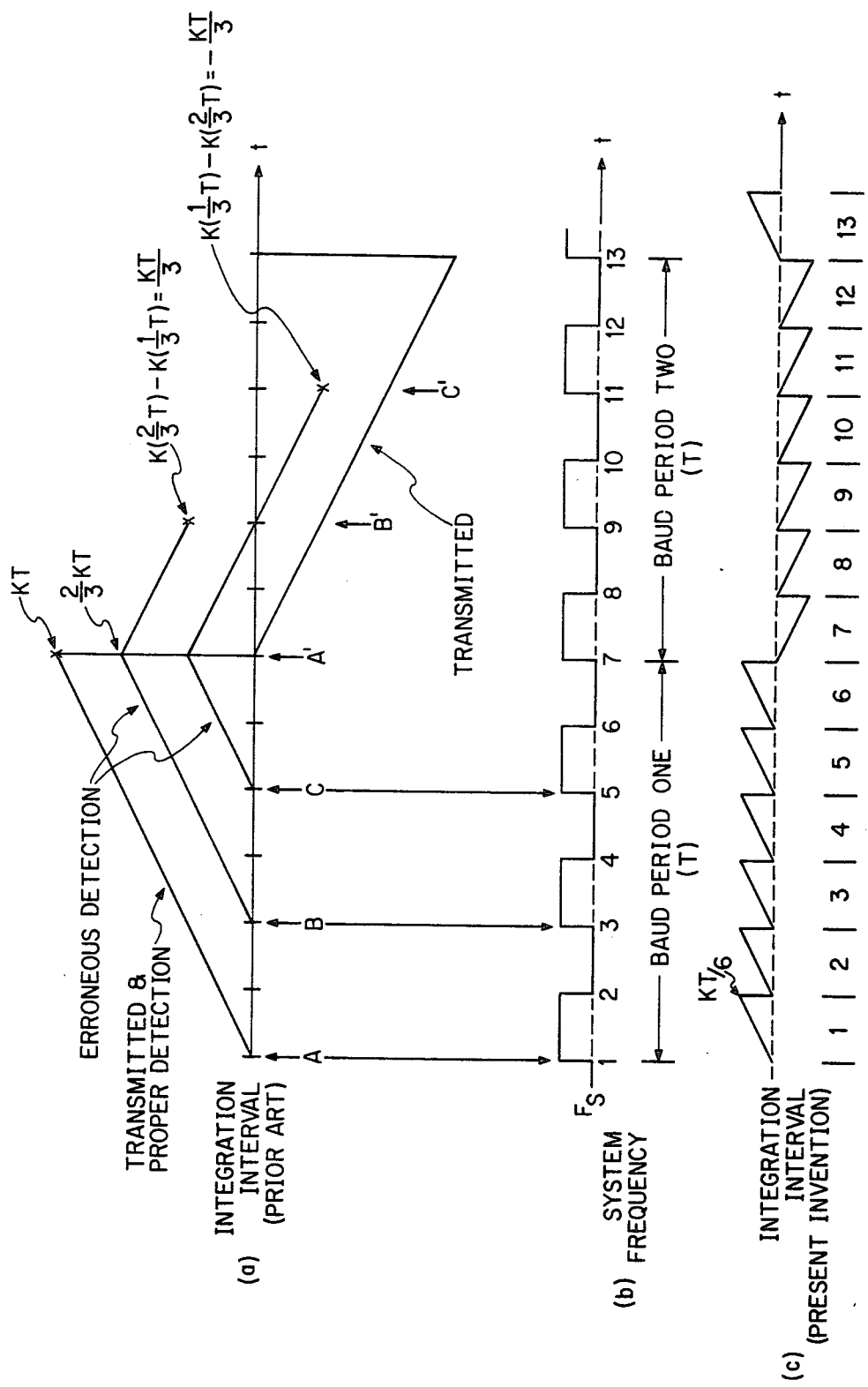
FIG. 1 consists of waveforms related to the invention.

The foregoing is represented as the first integration waveform (a) in FIG. 1 designated prior art. This waveform (a) corresponds to only one of the DC components being integrated and it is to be realized that the second component needed to define a baud comprising two bits is not shown since it would not contribute to the understanding of the reader. Assuming that the symbol timing was derived from waveform (b) designated $F_s$ for the system frequency signal, it will be observed that each baud period, and consequently each integration period, corresponds to three full cycles of $F_s$. Specifically, $F_s$ could be a system frequency such as found on the 60 hertz electric power system in the United States (limited in amplitude so as to produce the depicted square wave) with three cycles thereof then representing a data rate of 20 baud/second. Further assuming that a data period designated baud period one was transmitted coincident with the first zero crossing of $F_s$, at point A, the detector in the receiver would properly begin integrating at point A and terminate at point A' to afford an integrated value equal to kT where k can be any real number and T is the baud period (1/Baud Rate or 50 ms=1/20 herein). Now, through error, assume that rather than the first zero crossing shown for $F_s$ at point A in waveform b, the third zero crossing commencing with the second cycle designated point B, is chosen on which to begin the integration process. In this case, the integrated signal would linearly increase to a value of k(2/3T) at point A' and then decrease to a value of kT/3 at B' (assuming the value for baud period two would result in a negative DC trigonometric component) because of the overlap of the integration operation for baud period one into baud period two. Thus, instead of generating the proper value of kT for baud period one, kT/3 would be realized. Even though it is the polarity of the integrated value which determines the baud value, deviations in the magnitude thereof render the detection process more difficult to effectuate and, in fact, can introduce data errors created by a degradation in signal/noise ratio for the integrated signal. As an example, were the integration period for baud period one to begin on the fifth zero crossing at $F_s$ at point C, the integrated value attained would be $-kT/3$, clearly erroneous because of the negative, rather than positive sign.

The subject invention obviates the foregoing problem by subdividing the baud period into n intervals, such as six shown in waveform (c) of FIG. 1, for the system frequency signal $F_s$ having six zero crossings per baud period and developing n (six) baud values corresponding thereto. Rather than integrate over the entire period as represented by waveform (a), which would entail six integrators or a reduction in baud timing acquisition as explained in copending application Ser. No. 015,276, the integration process is preferably separately applied to each of the n intervals wherein each integration is initiated at the beginning of the interval and terminated at its end. Thus, as shown by waveform (c), six separate integrations are performed during baud period one, rather than the single one of waveform (a). The integrated value attained at the end of each interval is then added to the corresponding values for the preceding $n-1$ intervals or five in the example of waveform (c). Thus, at the end of interval 6 its value is added to that for intervals 1–5 to yield kT. Similarly, the integrated value attained at the end of interval 7 is added to the values corresponding to intervals 2–6. The foregoing integrated value summation is repeated at the end of each of the subsequent intervals by adding the integrated value attained to the previous five intervals. Consequently, each baud period gives rise to n or in the depicted example six integrated value summations indicative of the baud value rather than the single value of waveform (a). These six values can then be used not only for data detection but also for baud timing synchronization preparatory thereto as will be explained after the data acquisition process is described.

When an absolute reference frequency is employed, the integration process is performed after mixing the carrier signal with the reference frequency so that the polarity of each integrated value and consequently integrated value summation automatically determines the baud value. However, when the modulation is not predicated on an absolute reference, but rather DPSK where the reference signal during each baud period is derived from the carrier signal for the immediately preceding baud period, the carrier signal phase in the detected baud period is relative and therefore the integrated value summation attained at the end of each interval must be compared with its counterpart for the preceding period. Accordingly, the summations are stored for an additional period of time subsequent to their development so that they can be used as references against which to compare successive summations. For example, in deriving the baud value corresponding to interval 12, the integrated value summation for the six intervals 7–12 is compared with that for the six intervals 1–6. Similarly, the baud value corresponding to interval 13 is derived by comparing the integrated value summation for the six intervals 8–13 with that for the six intervals 2–7.

Figure 2:
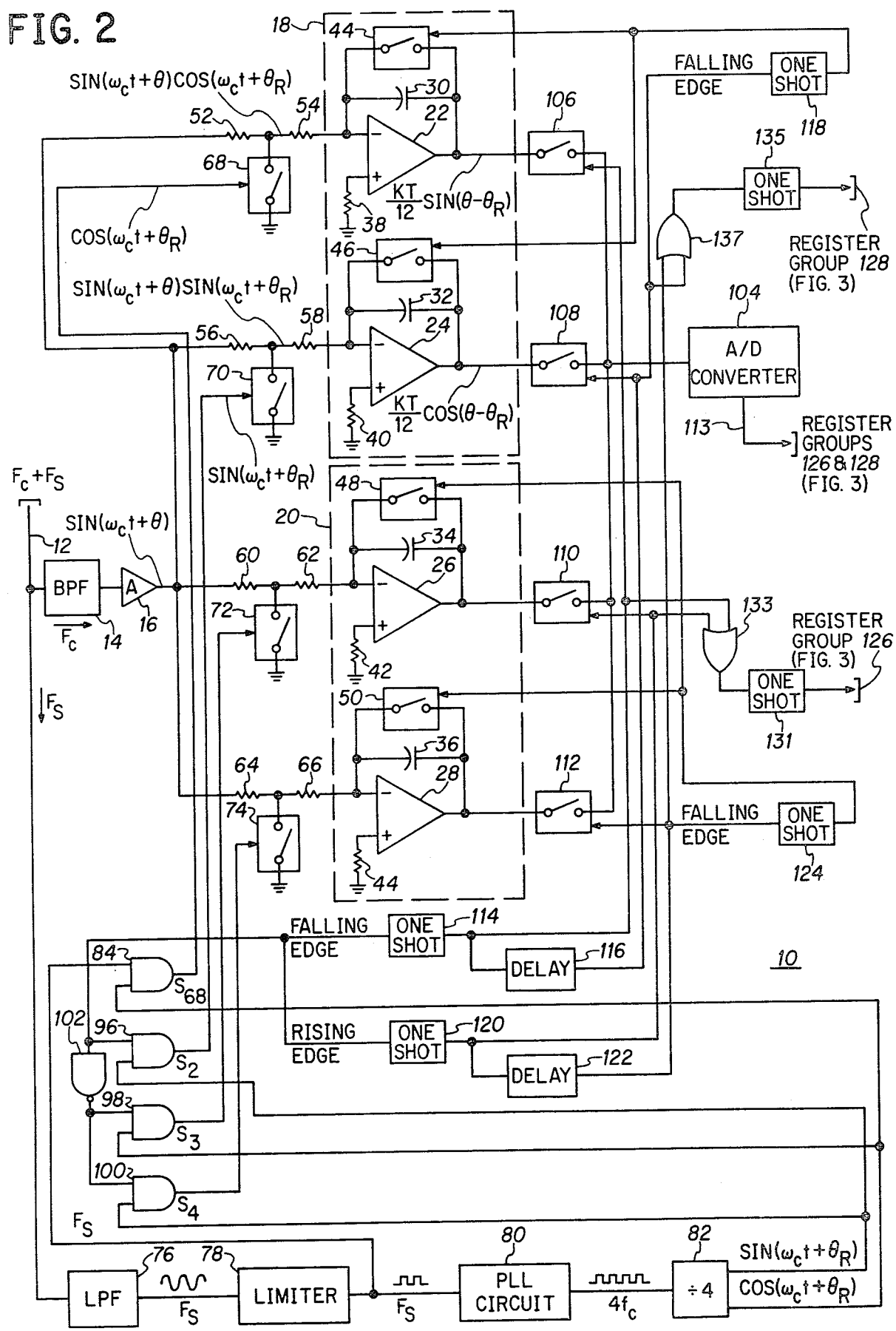
FIG. 2 depicts the integration and associated timing circuitry of the invention.

Referring now to FIG. 2, the preferred apparatus for providing the individual integration values will be described. As shown therein, the apparatus designated generally by the reference numeral 10, receives the AC carrier signal $F_c$ in which the data bauds are conveyed and the system frequency signal $F_s$ over lead 12 which would be connected to the electric power system where the carrier signal $F_c$ was transmitted thereover and $F_s$ corresponded to the 60 hertz power line frequency. $F_c$ is passed through a bandpass filter 14, whose bandpass is centered about the carrier frequency, and then amplified by amplifier 16 whose output is then the pure carrier signal $F_c$ defined as $\sin(\omega_c t + \theta)$ where $\omega_c = 2\pi f_c$ with $f_c$ being the carrier frequency and $\theta$ the phase angle, the characteristic of the carrier signal which defines the baud value. In other modulation schemes, the characteristic could just as well be either the frequency or amplitude of the carrier signal. The output of amplifier 16 is connected to a pair of integrating circuits 18 and 20, each of which comprises a pair of operational amplifiers, 22 and 24 for circuit 18, and 26 and 28 for integrating circuit 20. These four operational amplifiers 22–28 are arranged exactly the same so as to function as integrators and, as such, respectively comprise four capacitors 30–36 interconnecting their respective outputs with their inverting (−) inputs, four resistors 38–44 connecting their non-inverting (+) inputs to ground and symbolically depicted four switches 44–50 respectively connected across capacitors 30–36. The output of amplifier 16, $F_c$ is applied to the inverting inputs of amplifiers 22–28 through series connected resistors 52 and 54, 56 and 58, 60 and 62, and 64 and 66, respectively. The interconnection point of each pair of the foregoing series resistors is connected to ground through switches 68–74, respectively associated with amplifiers 22–28. These switches, which are depicted symbolically, would normally be implemented through a solid state design.

As is well known, cyclically controlling by a square wave the closure of a switch such as 68 which is connected to a signal path in synchronous detection produces the product of the signal entering the path and the Fourier sinusoidal components of the square wave at the output of the switch. Consequently, applying to switch 68 a square wave signal whose fundamental component is $\cos(\omega_c t - \theta_R)$ where $\omega_c = 2\pi f_c$, $f_c$ being the carrier frequency, and $\theta_R$ is some fixed reference phase angle, produces a signal to the inverting input of amplifier 22 equal to $\sin(\omega_c t + \theta) \cos(\omega_c t + \theta_R)$ which has a DC component that is proportional to $\sin(\theta - \theta_R)$ [which in this case is equal to $\sin(\theta - \theta_R)$ since the sinusoidal signals are assumed to have unity amplitude]. This result is clearly described in the U.S. Pat. No. 3,368,036, previously referred to, in connection with FIG. 1 thereof, where it will be recognized that mixer 18 for producing the requisite product has been preferably supplanted by electronic switch 68 of the subject invention as shown in FIG. 2 herein. None of the other products of the carrier signal and Fourier components produce a DC signal and are therefore of no interest. With switch 44 open and switch 68 operational in accordance with the control square wave signal represented by its fundamental component $\cos(\omega_c t + \theta_R)$, applied thereto, the DC voltage applied to the inverting input of amplifier 22 will cause the voltage developed across capacitor 30 to linearly vary, thus providing at the output of amplifier 22 the integrated value of the DC component with a like polarity. Since switch 68 is closed during every other half cycle of $f_c$, at which time amplifier 22 cannot integrate, this half-wave integration process does not produce a smooth ramp as shown by waveform (c) of FIG. 1 but rather a sequence of ramps separated by steps. This, of course, only affects the integrated value attained at the end of the integration interval and not the integration principle. If a smooth ramp over the full integration interval is desired, then the circuitry of FIG. 2 can be supplemented with that of FIG. 5 to be explained shortly. If the integration period is made equal to one of the intervals corresponding to waveform (c) of FIG. 1, the value attained at the end of the integration interval will be equal to KT/12 $\sin(\theta - \theta_R)$. By going through the same steps as the foregoing, it will be readily seen that the application to switch 70 of a control square wave signal whose fundamental component is $\sin(\omega_c t + \theta_R)$ will produce at the output of amplifier 24 at the end of an integration interval KT/12 $\cos(\theta - \theta_R)$ so long as switch 46 remains open for the interval.

When an absolute reference signal separate and apart from the carrier signal is employed, such as in absolute modulation schemes, the control signals $\sin(\omega_c t + \theta_R)$ and $\cos(\omega_c t + \theta_R)$ would be derived directly from the reference signal to that $\theta_R$ would normally be zero and the signs of $\sin(\theta)$ and $\cos(\theta)$ would automatically define the baud value. In such case, much of the apparatus shown in FIG. 3 for the DPSK implementation could be eliminated as will become clear hereinafter. However, when DPSK is employed such as herein, the baud value is determined by eliminating $\theta_R$ and developing the sin and cos of $(\theta_2 - \theta_1)$, where the subscript 2 corresponds to the baud period being detected and the subscript 1 corresponds to the preceding baud period. This will be explained later on.

In a similar fashion to the foregoing, $\cos(\omega_c t + \theta_R)$ and $\sin(\omega_c t + \theta_R)$ are applied respectively to switches 72 and 74 to produce at the outputs of amplifiers 26 and 28 KT/12 sin $(\theta - \theta_R)$ and KT/12 cos $(\theta - \theta_R)$ for also defining the carrier phase angle during some interval (vis-a-vis a fixed reference phase angle $\theta_R$). While one of the integrating circuits 18 and 20 is integrating, the other one is initialized (but only after an analog to digital conversion is performed as explained hereinafter) to prepare it for its integrating interval by discharging the associated capacitors through the associated switches connected thereacross. For example, if switches 44 and 46 were opened during interval 1 for waveform (c) of FIG. 1, while switches 68 and 70 were operational, integrating circuit 18 would in fact be integrating, during which time switches 48 and 50 would be closed to discharge their respective capacitors 34 and 36 to prepare integrating circuit 20 for its integration cycle during integration interval two. Of course, during interval two, switches 44 and 46 would be closed to permit their respective capacitors 30 and 32 to discharge so as to prepare integrating circuit 18 for its next integrating cycle during interval three. Thus, it is seen that integrating circuit 18 integrates during the odd numbered intervals and discharges during the even numbered intervals, while integrating circuit 20 conversely integrates during the even numbered intervals and discharges during the odd numbered intervals.

Figure 4:
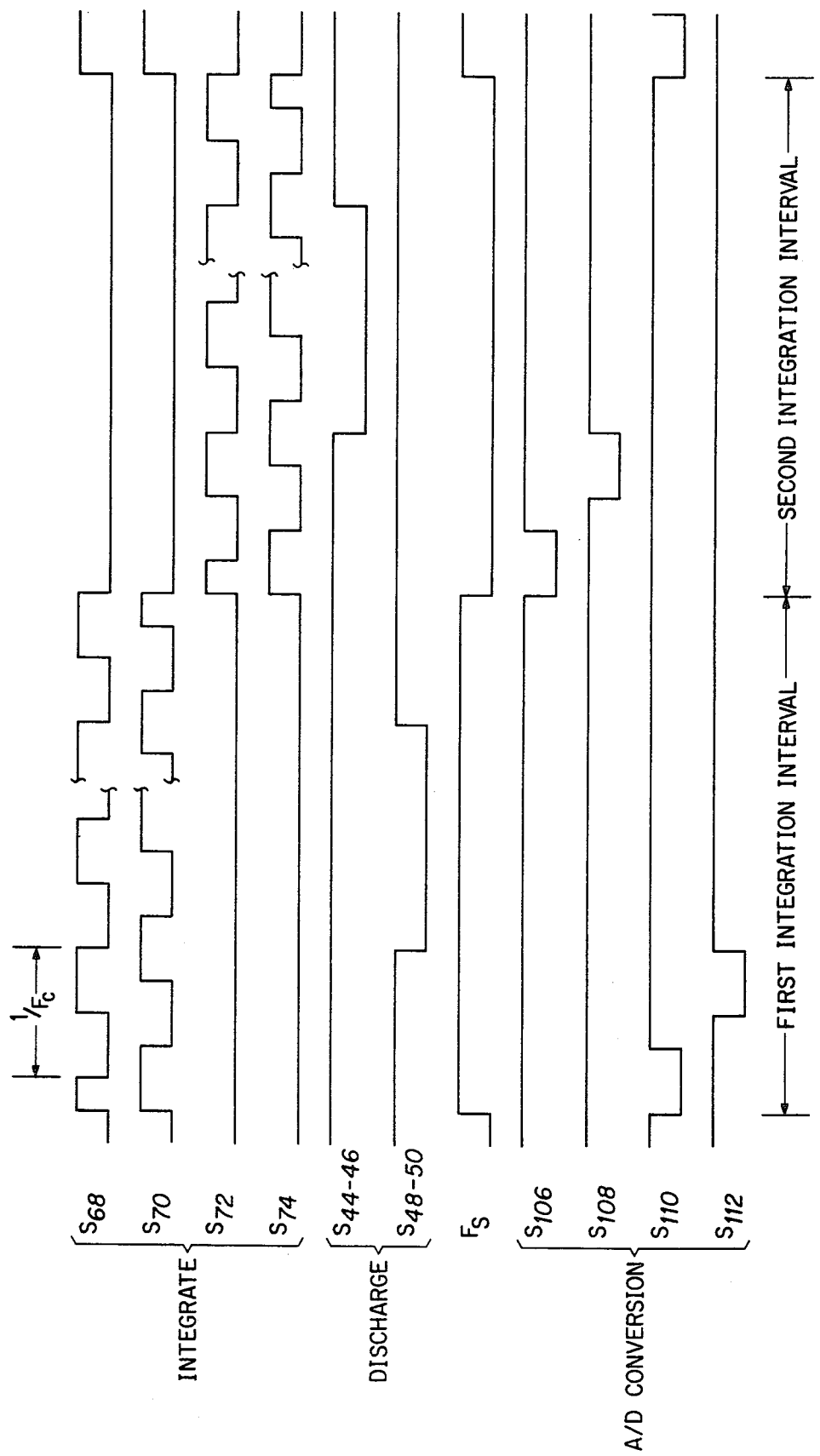
FIG. 4 consists of timing waveforms for use in conjunction with FIGS. 2 and 3 to facilitate an understanding of the invention.

The foregoing switch operations are reflected in the timing waveforms depicted in FIG. 4 wherein the first four waveforms are associated with controlling the operation of switches 68–74, respectively, and the next two waveforms control switches 44 together with 46 and 48 together with 50, respectively. A high level signal for the waveforms of FIG. 4 corresponds to a switch being open, while a low level signifies that the switch is closed. The waveforms of FIG. 4 are generated from the system frequency signal $F_s$ by first passing it through a low-pass filter 76 shown in FIG. 2 which eliminates unwanted frequencies such as the carrier signal $F_c$ and then, through a limiter 78, to provide an output signal which is a square wave whose frequency and phase are consonant with $F_s$. The output of limiter 78 is applied to a phase lock loop circuit 80 to produce at its output a square wave whose frequency is four times that of the carrier signal frequency $F_c$ which is locked together with the phase to the system frequency $F_s$. Thus as $F_s$ varies in frequency, as it may do so under adverse conditions so does the frequency 4 $f_c$ at the output of phase lock loop circuit 80. The output of phase lock loop circuit 80 is applied to a divide by 4 circuit 82 having two outputs which have a frequency equal to that of the carrier signal frequency $f_c$ and a phase angle $\theta_R$ with reference thereto, and which are represented mathematically only by their respective fundamental sinusoidal components. The two outputs have a phase angle difference of 90° so that one constitutes a sine function with the other constituting a cosine function. The cosine output of divide by 4 circuit 82 is connected as a first input to an AND gate 84 having a second input from the output of limiter 78 so that the gate is enabled to pass the square wave to its output $s_{68}$ during the first integration interval of $F_s$ shown in FIG. 4, as well as all successive odd integration intervals. During these odd integration intervals when AND gate 84 is enabled, the signal $s_{68}$ is applied to switch 68 to cause it to synchronously open and close which as already mentioned is equivalent to the mixing function of mixer 18 of FIG. 1 of the U.S. Pat. No. 3,368,036 previously alluded to. Consequently, the product of sin $(\omega_c t + \theta)$ and cos $(\omega_c t + \theta_R)$ is formed at the interconnection of the switch 68 with resistors 52 and 54. During this time it is to be noted that switches 44 and 46 are open to permit their respective capacitors 30 and 32 to linearly build up voltage during the integration interval. Since switch 68 is closed half the time during the integration interval, which inhibits the capacitor from receiving any charging current, as mentioned earlier the integration waveform would not be a smooth ramp as depicted in FIG. 1, but rather a sequence of little ramps (when switch 68 is open during the high level half cycles of the square wave) connected by flat portions when switch 68 is closed (during low level portions of the square wave $s_{68}$).

Figure 5:
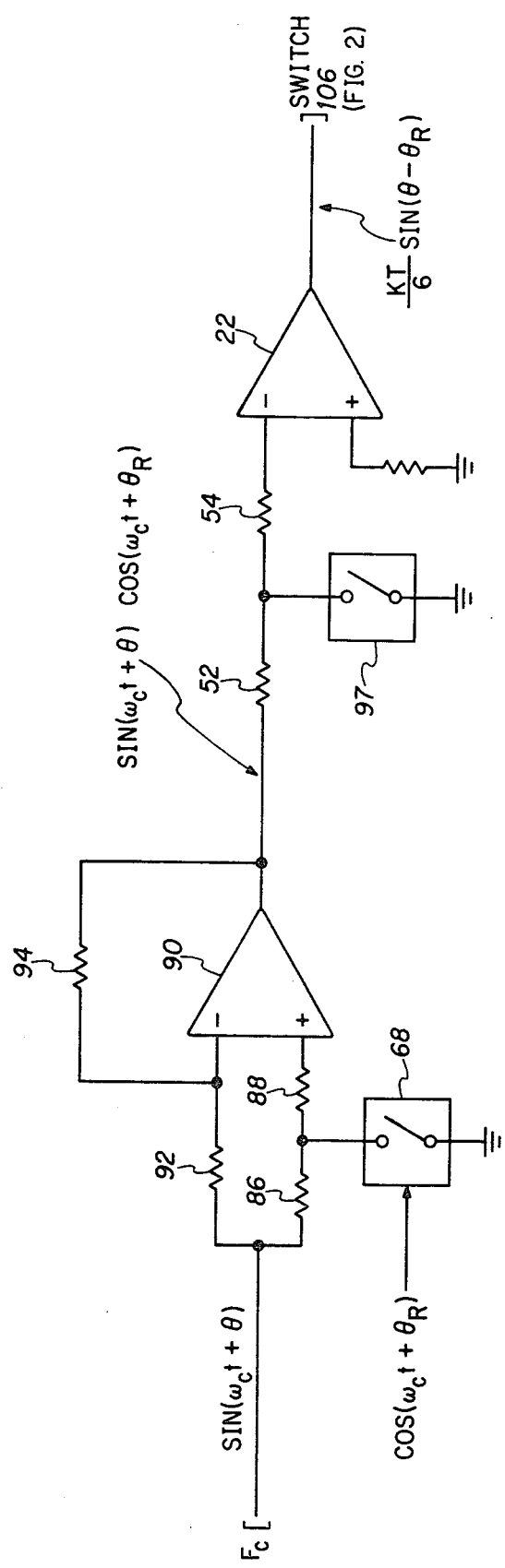
FIG. 5 shows circuitry supplementary to that of FIG. 2 for affording full-wave integration rather than half-wave in the detection process.

If integration throughout an integration interval is desired, then each of the operational amplifiers 22–28 can be supplemented with additional circuitry as shown in FIG. 5 in connection with operational amplifier 22. It will be seen therein that the mixing and integrating functions have been totally separated by connecting the synchronous switch 68 to the interconnection point of a pair of resistors 86 and 88, with resistor 88 being connected to the noninverting input of another operational amplifier 90. The carrier signal $F_c$ is applied to the noninverting input of operational amplifier 90 through the series resistors 86 and 88 as well as to the inverting input via a resistor 92. With another resistor 94 interconnecting the output and the inverting input of operational amplifier 90, a full-wave mixer with a gain of ±1 is provided, by making resistors 92 and 94 the same value, and 86 and 88 as well. So long as a new switch 97 connected to the interconnection of resistors 52 and 54 associated with operational amplifier 22, is left open during the full integration interval, a smooth linear ramp will be obtained at the output of amplifier 22 without any steps in the waveform.

At the end of the first integration interval, the output of operational amplifier 22 is the integrated value of the DC component for the product of the sin $(\omega_c t + \theta_1)$ and cos $(\omega_c t + \theta_R)$, namely KT/12 sin $(\theta_1 - \theta_R)$. In a similar fashion it will be seen that the output of operational amplifier 24 at this time is KT/12 cos $(\theta_1 - \theta_R)$ because of the application to switch 70 of sin $(\omega_c t + \theta_R)$ via an AND gate 96 having a second input derived from the output of limiter 78. Furthermore, it will be seen that the outputs of operational amplifiers 26 and 28 at the end of the second integration interval are respectively KT/12 sin $(\theta_2 - \theta_R)$ and KT/12 cos $(\theta_2 - \theta_R)$ by virtue of the application of cos $(\omega_c t + \theta_R)$ to switch 72 via an AND gate 98 and sin $(\omega_c t + \theta_R)$ to switch 74 via an AND gate 100. Both AND gates 98 and 100 have a second input which is derived from the output of limiter 78 after first inverting the signal through inverter 102. Consequently, these AND gates are enabled to pass their respective square waves during the even integration intervals associated with the system frequency signal $F_s$.

The outputs of amplifiers 22-28 are connected to an analog/digital (A/D) converter 104 via four individual switches 106-112 respectively associated therewith. The analog integrated value outputs of amplifiers 22-28 are thus converted to digital equivalents at the output of A/D converter 104 on bus 113 (which preferably comprises multiple leads for parallel bit operation) in multiplex fashion by sequentially closing switches 106-112. For example, switch 106 is closed upon the termination of the first integration interval by a low level signal generated at the output of a one shot multivibrator 114 which is triggered by the falling edge of the output of limiter 78, namely $F_s$. After sufficient time has transpired for the conversion to be effected, switch 106 is opened at the end of the one shot period and switch 108 is closed by the same output from one shot 114 via a delay circuit 116. Following the A/D conversions for the outputs of amplifiers 22 and 24, their respective capacitors 30 and 32 are discharged by the closure of the switches 44 and 46. The signal for this operation is derived by triggering a one shot multivibrator 118 by the falling edge output from delay circuit 116. In similar fashion, switch 110 is closed during each odd integration interval, after its associated integrating circuit 20 even integration interval, by the output of a one shot multivibrator 120, which is triggered by the rising edge of the output of limiter 78. Switch 112 is thereafter closed by first passing the output of one shot 120 through a delay circuit 122. Switches 48 and 50 are closed to discharge their respective capacitors 34 and 36 through a one shot multivibrator 124 which is activated by the falling edge of the output of delay circuit 122. The timing waveforms corresponding to the foregoing discharge and conversion operations are shown in FIG. 4.

Figure 3:
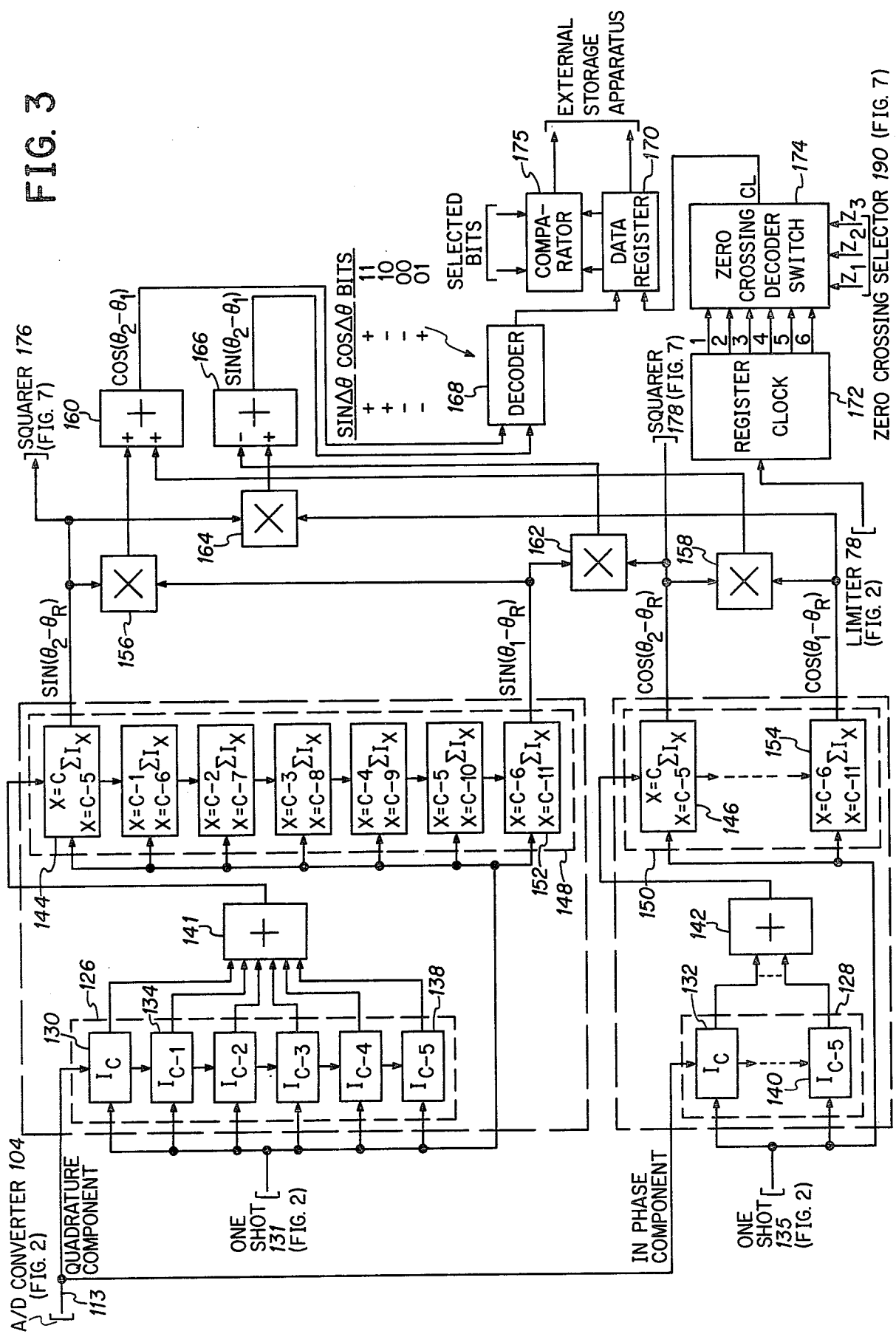
FIG. 3 depicts the digital components of the invention for storing and combining the various digital signals to derive the data for both detection and baud timing synchronization purposes.

As shown in FIG. 3, the storage circuitry for retaining the digital integrated value outputs of A/D converter 104 on lead 113 comprises one group of six series connected registers 126 corresponding to the quadrature (sine) component, and another set of six series connected registers 128 corresponding to the in phase (cosine) component. Each time a new integrated digital value $I_c$ (the subscript c denoting current interval) is generated at the output of A/D converter 104, it is stored in the first register of a register group, the quadrature component being placed into register 130 of group 126, and the in phase component into register 132 of group 128. Just prior thereto the value in each register is shifted to the next register in the series chain so that the value that had been stored in register 130 is passed to register 134 and likewise, the value that had been stored in register 132 is passed to the next register (not shown) in the chain for group 128. The values stored in the last registers of the register groups, namely 138 for group 126 and 140 for group 128, are no longer retained when supplanted by the new value received from the preceding register. The foregoing is represented by the notation $I_{c-1}$ through $I_{c-5}$ for the registers in the groups 126 and 128. The registers of register group 126 corresponding to the quadrature component are clocked by the output of a one shot multivibrator 131, shown in FIG. 2, which is triggered at the end of an A/D conversion operation by the lagging edge of the A/D control pulses (FIG. 4 waveform) for controlling quadrature component switches 106 and 110 via an OR gate 133 whose inputs are connected to the outputs of one shot multivibrators 114 and 120. Likewise, the registers of register group 128 corresponding to the in phase component are clocked by the output of a one shot multivibrator 135 by the lagging edge of the A/D control pulses for controlling in phase component switches 108 and 112 via an OR gate 137 whose inputs are connected to the outputs of delay circuits 116 and 122.

Upon receipt of each new integrated digital value $I_c$, the outputs of the registers in each register group 126 and 128 constituting the corresponding integrated values for the previous five intervals (c-1 to c-5) are digitally summed by respective digital adders 141 and 142. The digital integrated value summations of adders 140 and 142, denoted $$\sum_{x=c-5}^{x=c} I_x,$$

are then applied to registers 144 and 146 respectively, each of which is the first register of a group of seven series connected registers 148 and 150 respectively. As with the register groups 126 and 128, each register in groups 148 and 150 passes the digital value stored therein to the next succeeding register prior to receiving the digital stored value in the preceding register under the clock output of one shot multivibrators 131 and 135, respectively. Since there are seven registers in each group 148 and 150, the summations of six integrated values entered into the first registers 144 and 146 are eventually stored in the last registers 152 and 154 of groups 148 and 150 respectively, six integration intervals later. Also, since differential phase shift keying entails comparing each baud period with the previous baud period acting as a reference, and since six integration intervals constitute a full baud period cycle herein, the output of register 144, which is proportional to $\sin(\theta_2 - \theta_R)$, is compared with the output of register 152, which is proportional to $\sin(\theta_1 - \theta_R)$ where, the subscript 2 denotes a current summation period and the subscript 1 denotes the preceding summation period. Similarly, the outputs of registers 146 and 154, respectively, proportional to $\cos(\theta_2 - \theta_R)$ and $\cos(\theta_1 - \theta_R)$ are employed in the comparison to eliminate the reference angle $\theta_R$ and obtain the phase angle advancement of $\theta_2 - \theta_1$ in consecutive baud periods. Thus, as delineated in the U.S. Pat. No. 3,368,036, the outputs of registers 144 and 152 are multiplied in digital multiplier 156 and summed with the product of the outputs of registers 146 and 154 appearing at the output of digital multiplier 158 in digital adder 160 to render the term $\cos(\theta_2 - \theta_1)$. The term $\sin(\theta_2 - \theta_1)$ is obtained by subtracting the product of the outputs of registers 152 and 146, available at the output of digital multiplier 162, from the product of the outputs of registers 144 and 154, available at the output of digital multiplier 164, in digital adder 166. The signs of the output signals for adders 160 and 166 define the two bit values engendered by the baud as represented by the summation of integrated values corresponding to the six integration intervals, appearing serially at the output of decoder 168 with the designated format.

Since there are six intervals during each baud period, it is readily apparent that there will be six values of baud data, each consisting of two bits, for selecting the proper baud value. Only one of these is shifted into a data register 170 under the control of a register clock 172 whose output is interconnected with the register 170 via a zero crossing decoder switch 174 having three input control signal leads $Z_1$-$Z_3$. Register clock 172 has a single input from limiter 78 and six output leads, there being one for each of the six zero crossings during a baud period. Each zero crossing transition of the square wave signal at the output of limiter 78 causes two sequential pulses to appear at the output lead of control clock 172 adjacent the last output lead so energized, which sequential operation is then repeated upon the next zero crossing. A simple means of effectuating the foregoing would be a ring counter with a maximum count of six coupled with a pair of one shots for each of the n leads (not shown). The two sequential pulses on one of the output leads of control clock 172, when passed by decoder switch 174 to data register 170, causes the two data bits appearing at the output of decoder 168 to be clocked into register 170. The output lead selected, and consequently the designated zero crossing corresponding thereto, is determined by the binary value appearing on the input leads $Z_1$-$Z_3$ to decoder switch 174. For example, referring again to FIG. 1, if the first zero crossing (point A) and every sixth zero crossing thereafter (1, 7, 13, etc. of waveform c) was determined to be the appropriate zero crossing, the bit pattern of leads $Z_1$-$Z_3$ would cause decoder switch 174 to connect the top lead (assuming it was made to correspond to the first zero crossing by initialization to a preset state upon the application of power thereto) to register 170. If the second zero crossing were determined to be the correct one, then the bit pattern for $Z_1$-$Z_3$ would connect the second lead from the top to register 170, and so on. As bits are received they are sequentially entered into register 170 once each baud period until a recognizable pattern for selected fields (e.g. preamble, receiver address, etc.) is discerned in register 170 via comparison with a comparator 175 to which the selected bits are applied. Upon a successful match, the message contained in register 170 is considered valid and transferred to external storage apparatus (not shown) on response to a control signal generated at the output of comparator 175.

The correct zero crossing and consequently bit pattern for leads $Z_1$-$Z_3$ is determined through the realization that disregarding spurious signals such as noise, the maximum integrated DC value which can be achieved in any baud period, as depicted in waveform A of FIG. 1, is equal to KT. Since any normal digital message will contain a combination of 1's and 0's, and consequently positive and negative DC values, it is readily apparent from waveform A that the selection for the baud timing signal in the receiver of the zero crossing to which the transmitted carrier signal baud timing was originally synchronized will result in a sequence of DC integrals of maximum value, especially over any extended baud period guaranteeing 1's and 0's in a message. The invention herein exploits this by sampling data (in the form of dummy messages or actual repetitive messages) conveyed by the carrier signal for each one of the n (six herein) possible zero crossings over a plurality of successive baud periods and then comparing the results to determine which zero crossing produces the largest sample magnitude. This is displayed graphically through the mathematical matrix representation shown in FIG. 6 wherein each column represents a different one of the six zero crossings appropriately numbered which occur during each baud period and each row represents one entire sequence of six successive samples Sa obtained, preferably from the DC signal integrations over a full baud period corresponding to six successive zero crossings. For example, looking at the first row it is seen that the sample $Sa_{11}$ obtained by integrating the DC signal representative of the carrier characteristic phase angle over a time equal to a baud period beginning with the first zero crossing for waveform b of FIG. 1 is entered in the first column, with the first numerical subscript for Sa denoting the sequence and the second subscript the zero crossing location within a sequence. The next integrated DC value $Sa_{12}$ beginning with the second zero crossing is entered in the second column, etc. It is to be noted that these integrated values can be generated through the partial integration technique of waveform c, as preferred, or through six separate integrations corresponding to waveform A. After $Sa_{16}$ corresponding to the sixth zero crossing for baud period one is entered in the first row in the sixth column, a second row is begun for the next or second sequence so that the first zero crossing sample $S_{21}$ for the second baud period is entered in the first column, etc. As many sequences as desired, denoted by the designation m can be used. Although the samples Sa in a single sequence are shown as derived from a single baud period, it is recognized that each consecutive sample can be derived from a consecutive baud period in formulating the matrix if one is willing to accept longer synchronization acquisition times.

Once the matrix is completed, the samples Sa in each of the columns is summed ($\Sigma Sa_x$ with the subscript x denoting the zero crossing) and compared with one another to render the largest value and the correct zero crossing corresponding thereto. The matrix is constantly updated as valid signals are detected in the receiver so that should for any reason another zero crossing other than the one selected for synchronization become the one for the synchronization for the transmitted signal it will be identified and substituted for the earlier selected zero crossing. As will be appreciated hereinafter, precautions are taken not only for assuring the validity of a signal, but also the validity of a new and different zero crossing before it is accepted in lieu of an earlier determined zero crossing.

Figure 7:
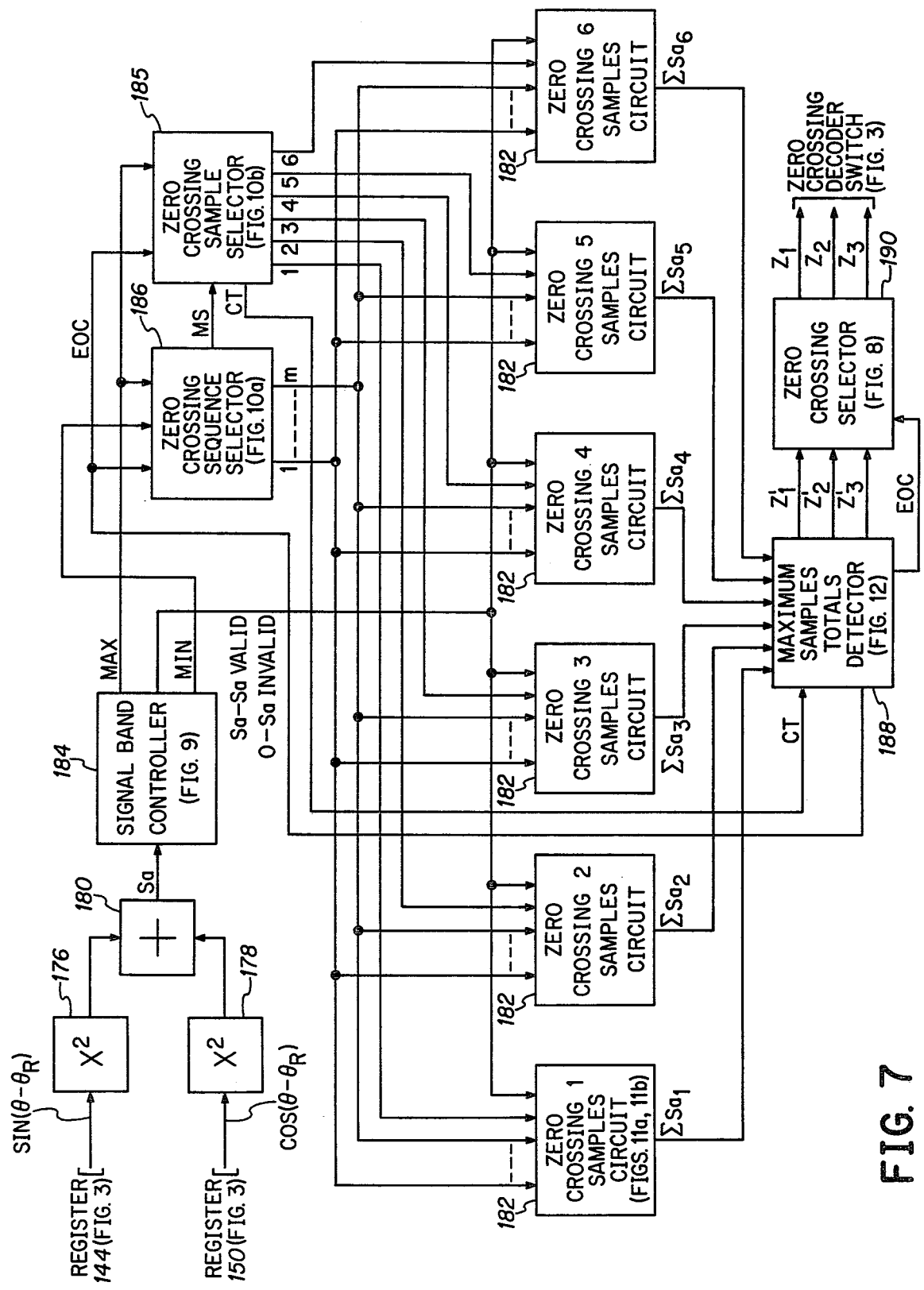
FIG. 7 is a block diagram of the apparatus for formulating the matrix of FIG. 6.

FIG. 7 depicts the circuitry in block form for performing the zero crossing sample analysis. Each zero crossing sample Sa is derived by summing the square of the in phase and quadrature components of the DC signal representative of the angular phase shift $\theta$ which eliminates the sign of the DC signal since it is only the signal magnitude and not the data value that is important here. Any convenient point in the data detection circuitry may be employed for this purpose; e.g. the outputs of registers 144 and 150 of FIG. 3 provide a usable signal already in digital form for the quadrature (sine) and in phase (cosine) components, albeit with respect to the reference phase angle $\theta_R$ which is of no consequence. These signals are applied to digital squaring circuits 176 and 178, respectively, wherein the magnitudes are individually squared, with the outputs thereof then being applied to a digital summer 180. The output of summer 180, which constitutes the desired zero crossing sample Sa, is selectively applied to six zero crossing samples circuits 182 via a signal band controller 184 which, as will be described shortly, establishes a band within which a signal sample Sa must fall before it is accepted as being valid. As in the earlier drawings, for the sake of clarity, the sample data Sa passing from the output of summer 180 to the sample circuits 182 is depicted over a single bus lead rather than with the multiple leads which are required for parallel transmission of the multiple bits representative of the signal sample Sa. Each samples circuit 182 stores the samples corresponding to an individual zero crossing, and consequently one of the columns of the matrix of FIG. 6 (e.g. the left samples circuit 182 corresponding to the first column and the right most samples circuit 182 corresponding to the sixth column), providing at its output the sum of its respective samples $\Sigma Sa_x$ after they have all been received. The details of the samples circuits 182 will be presented shortly in conjunction with FIGS. 11a and 11b. A zero crossing sample selector circuit 185 having individual outputs connected to the samples circuits 182 sequentially enables the circuits 182 to receive the signal samples Sa while a zero crossing sequence selector circuit 186 having m output leads connected to all of the samples circuits 182 controls which sequence is currently operative and consequently the row of the matrix in FIG. 6 to be filled with stored samples Sa for the samples circuits 182. Their operation will be delineated shortly in conjunction with FIGS. 10a and 10b.

The outputs $\Sigma Sa_x$ of samples circuits 182 are applied to a maximum samples totals detector 188 wherein the totals for the samples stored in the six samples circuits 182 are compared with one another to identify the largest one. The binary equivalent of the largest one of the six is designated by the three output leads $Z_1'-Z_3'$ which are applied to a zero crossing selector 190 wherein the information is stored. To enhance the reliability of the invention, the zero crossing selection is not predicated on a single matrix analysis in the preferred embodiment, but rather two consecutive such analyses which render the same zero crossing. This function is performed by zero crossing selector 190 wherein its three output leads $Z_1-Z_3$, constituting the binary representation of the zero crossing to which synchronization is to be made, cannot change until two matching consecutive inputs thereto are received from the outputs of totals detector 188.

Figure 8:
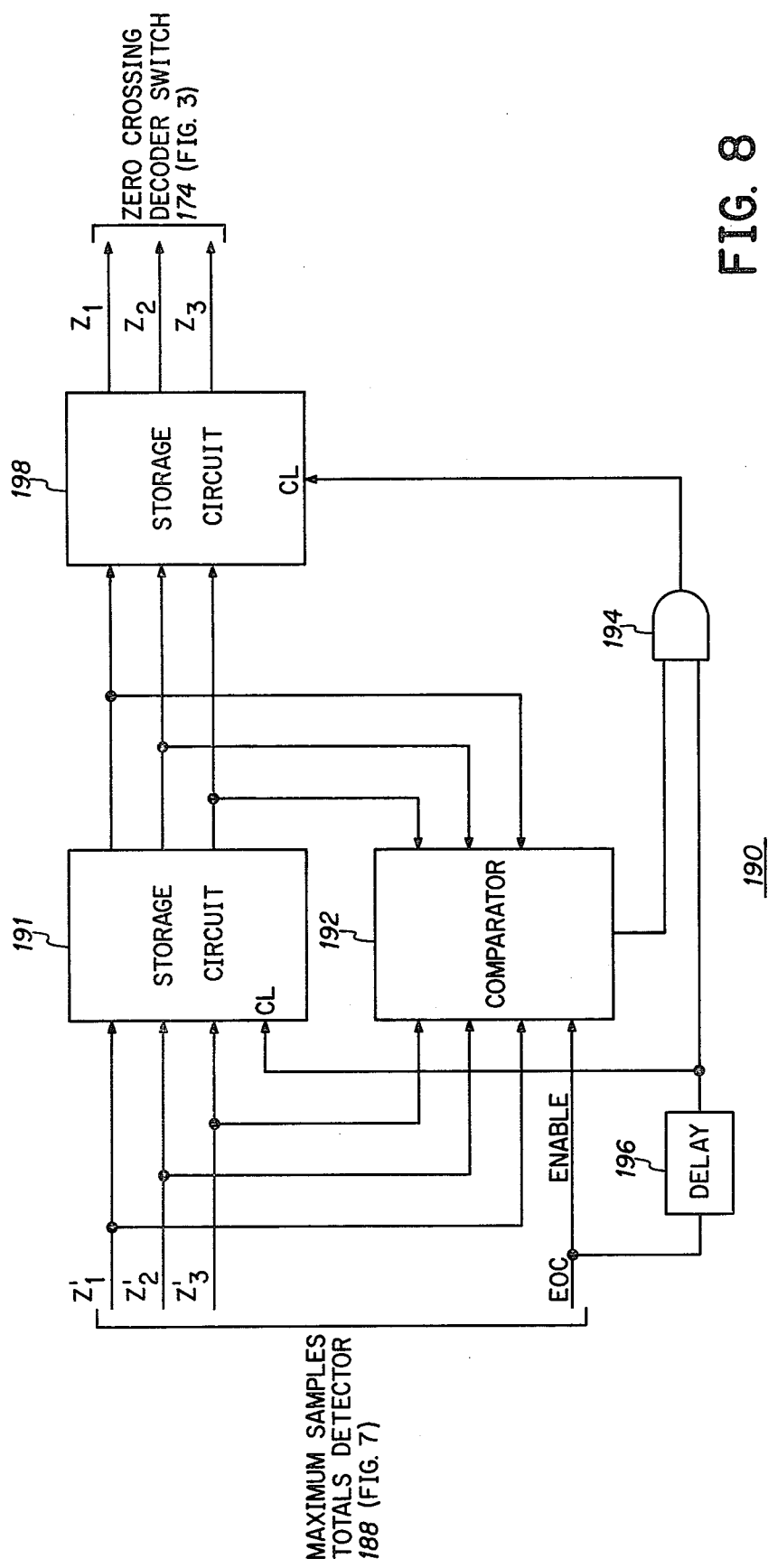
FIG. 8 is a detailed presentation of the zero crossing selector of FIG. 7.

The circuitry for effectuating the foregoing enhanced reliability is shown in FIG. 8 wherein the outputs $Z_1'-Z_3'$ of totals detector 188 are applied to any conventional storage circuit 191 whose output leads together with leads $Z_1'-Z_3'$ are connected to a comparator circuit 192 so that the bits thereon can be compared with one another. Upon the complete formation of each matrix of FIG. 6, an end of cycle signal EOC is generated (by the circuitry of FIG. 12) which is applied to comparator 192 to permit the newest zero crossing information contained on leads $Z_1'-Z_3'$ to be compared with the immediately preceding zero crossing information contained on the output leads of storage circuit 191 wherein it was retained. Should comparator 192 detect a match, indicating the consecutive indentification of the same zero crossing, it generates a high level signal on its output lead to enable an AND gate 194 to pass the EOC signal via a delay circuit 196 as a clock pulse to another storage circuit 198 whose input is connected to the output of storage circuit 191. Consequently, the binary representation for the zero crossing so consecutively identified is stored in storage circuit 198 and provided at its output leads $Z_1-Z_3$ which are connected to the zero crossing decoder switch 174 of FIG. 3 to select the designated zero crossing to which synchronization is to be made. If comparator 192 detects no match between its two inputs, no clock signal is generated at the output of AND gate 194 resulting in no change at the output of storage circuit 198. The delayed EOC signal at the output of delay circuit 196 is used to clock the bits on leads $Z_1'-Z_3'$ into storage circuit 191 as well as the output bits of storage circuit 191 into storage circuit 198.

Figure 9:
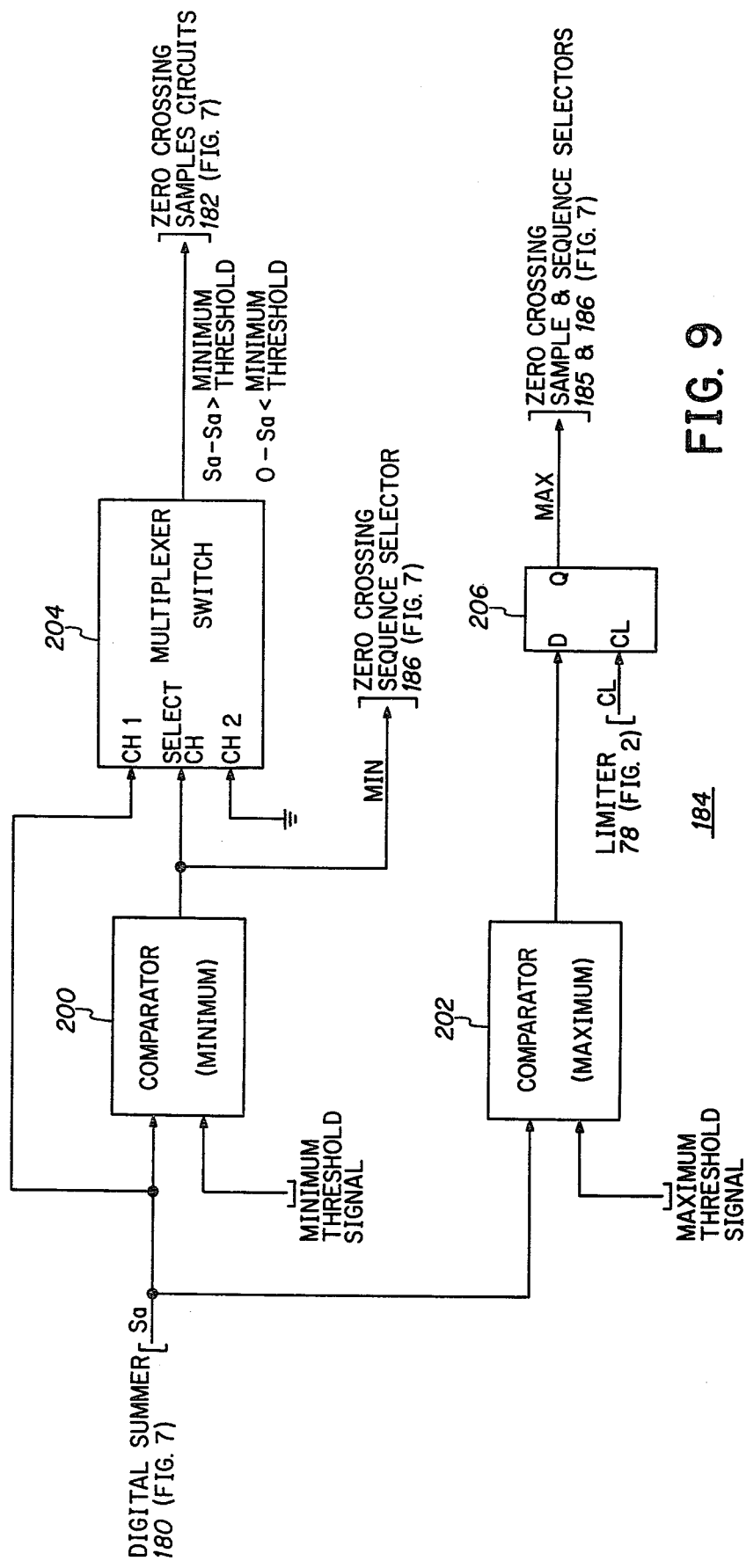
FIG. 9 is a detailed presentation of the signal band controller of FIG. 7.

The details of signal band controller 184 are shown in FIG. 9 wherein each signal sample Sa from the output of digital summer 180 is applied to two comparator circuits 200 and 202. Comparator 200 compares the sample Sa with a minimum threshold signal applied thereto to ensure that the magnitude of Sa is not so small as to be erroneously considered a valid signal rather than some spurious signal such as noise. If the sample Sa exceeds the minimum threshold signal, signal band controller 184 permits the sample Sa to be applied to the samples circuits 182 via channel 1 (CH 1) of a dual channel multiplexer switch 204 which selects that channel by virtue of one level of a bilevel signal at the output of comparator 200 indicating that the minimum threshold signal was exceeded by the sample Sa magnitude. However, if the minimum threshold signal is not exceeded by sample Sa the other level of the bilevel signal output of comparator 200, indicating as much, selects a zero value derived from a ground level applied to multiplexer 204 on the second channel (CH 2) to pass to the samples circuits 182 in lieu of the sample Sa. This avoids biasing the matrix of FIG. 6 with spurious signals such as noise. The bilevel output signal of comparator 200 is also provided as an input signal MIN to the zero crossing sequence selector circuitry of FIG. 10b, to be addressed shortly, for further enhancing the reliability of the invention by inhibiting the initiation of a new sequence unless the current sequence contains a minimum number of valid samples Sa.

Comparator 202 is employed to ensure that the magnitude of the sample signal Sa does not exceed some maximum threshold to avoid the detrimental effects of considering an extraordinarily large signal that could prove meaningless because of non-linear saturation effects. In this case, all of the prior samples Sa to that signal are rejected by starting the matrix of FIG. 6 anew before making any zero crossing determination. This is accomplished by applying the bilevel output signal of comparator 202 as an input to a D type flip-flop whose output constitutes a maximum threshold exceeded signal MAX. Upon the inception of each new sample Sa coincident with a zero crossing of the 60 hertz AC signal, a clock signal applied to flip-flop 206 (which can be derived from the output of limiter 78 of FIG. 3) permits the output of comparator 202 to appear at the Q output of flip-flop 206. The level of the bilevel output signal of comparator 202 corresponding to the maximum threshold being exceeded by signal sample Sa thus appearing as the Q output of flip-flop 206 constitutes the MAX signal, which when applied to the circuitry of FIG. 10 initiates a new matrix cycle before the current one is completed.

Figure 10A:
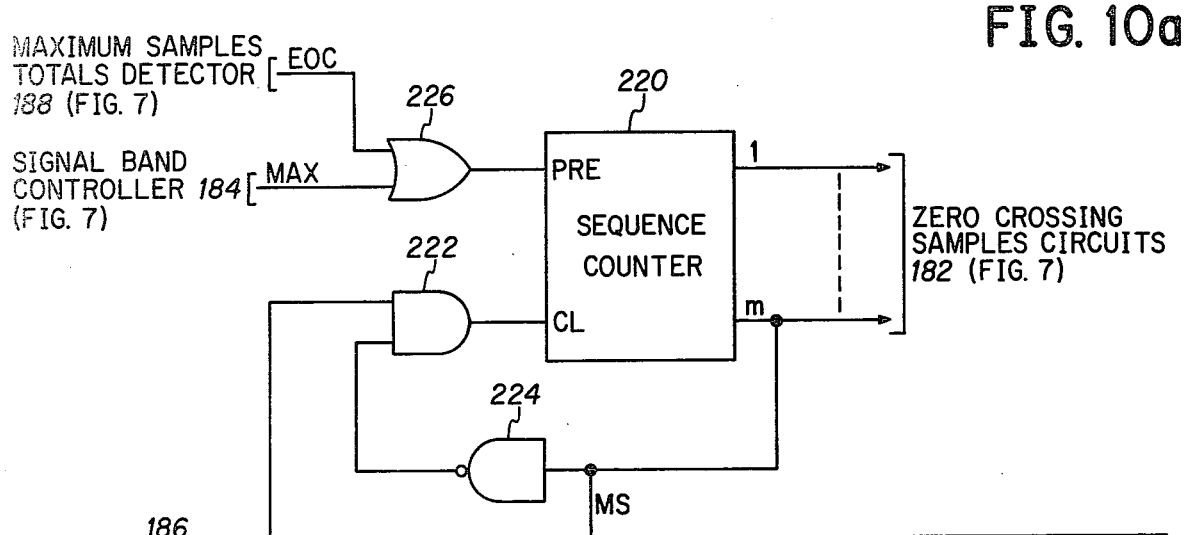
FIGS. 10a and 10b respectively detail the zero crossing sample and sequence selectors of FIG. 7.
Figure 10B:
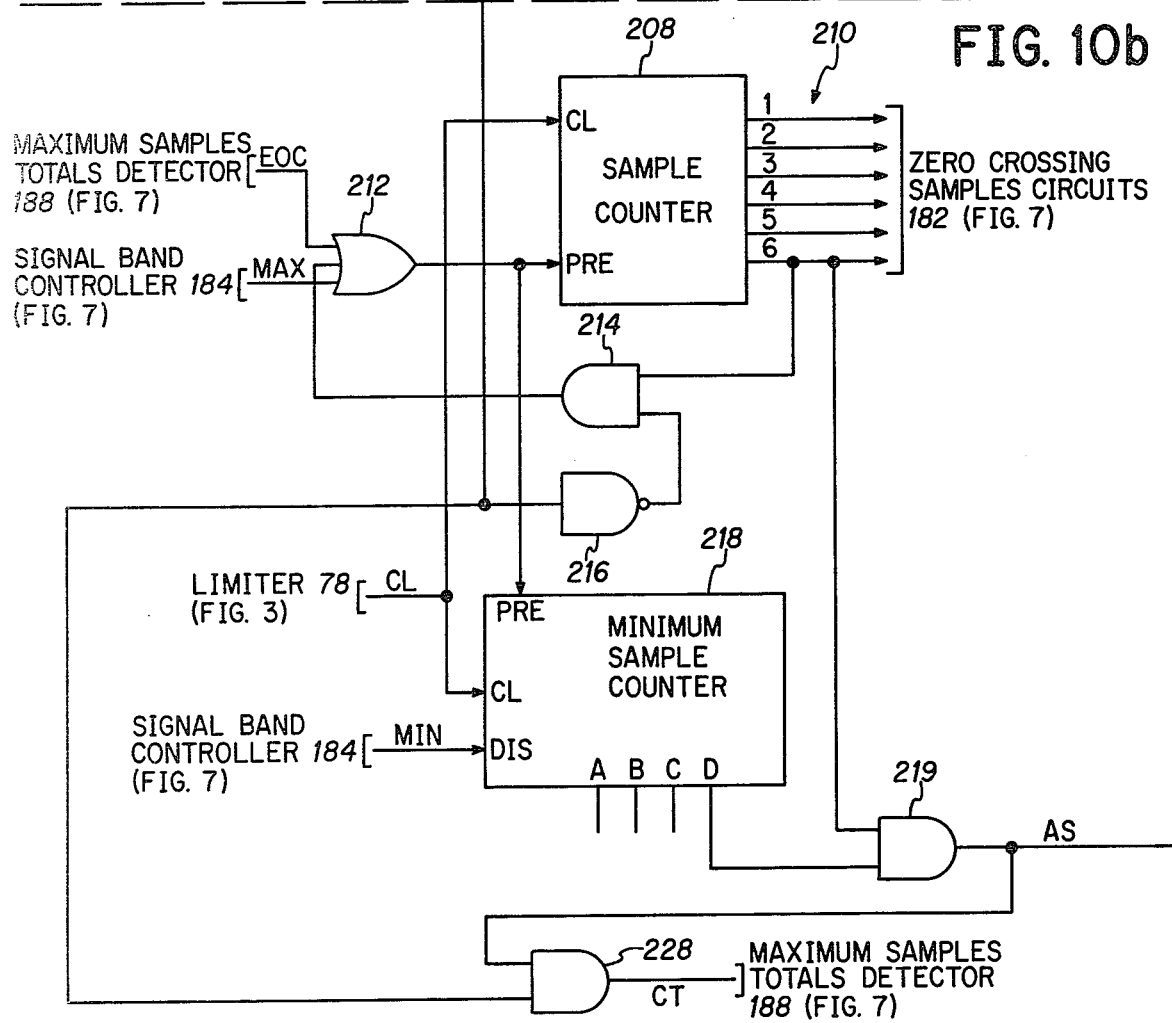

As shown in FIG. 10b, zero crossing sample selector 185 comprises a sample counter 208 having six output leads 210, each of which is connected to a different one of the samples circuits 182, with the leads 210 being sequentially energized during a counting cycle. Each counting cycle begins with a fixed state, such as the topmost lead 210 (1) being energized, in response to being preset by a signal at the output of an OR gate 212 having three inputs, two of which correspond to the EOC and MAX signals previously alluded to. Upon the occurrence of either the end of a matrix cycle or a magnitude threshold exceeded, as denoted by the aforementioned signals respectively, sample counter 208 is initialized to the first zero crossing sample of column 1 or the matrix of FIG. 6 to permit the formation of a new matrix. Also, since each new sequence of the matrix within an incompleted matrix cycle must begin with the first column, the counter 208 is initialized thereto by a third input to OR gate 212 derived from the output of an AND gate 214 whose two inputs are derived from the bottommost output lead 210 (6), corresponding to the sixth crossing sample or column 6 of the matrix of FIG. 6 and a signal, designated MS, for m sequence which is derived from the zero crossing sequence selector 186 shown in detail in FIG. 10a. So long as the sequence effected by the sequence selector 186 is not the last or mth one, AND gate 214 is enabled to pass the leading edge of the pulse appearing on the bottommost output lead 210 (6) at the end of each sequence so that a new sequence can be initiated with the first column upon the presetting of sample counter 208. However, once the last sequence m is invoked, a new sequence is precluded from being initiated by virtue of the disablement of AND gate 214 in order to permit a comparison of the samples totals to be made in maximum samples totals detector 188 before any new samples are entered in the matrix. Sample counter 208 is clocked by any suitable clock signal derived from the 60 hertz AC signal such as the output of limiter 78 of FIG. 2 since each successive zero crossing results in a new sample to be entered in the matrix.

As mentioned previously, a new sequence is not initiated unless a current sequence exhibits a minimum number of valid samples Sa so as to enhance the reliability of the invention. This is accomplished through a minimum sample counter 218 which is preset to a fixed state at the beginning of each counting cycle via the output of OR gate 212. Counter 218 increments its count in response to the same clock signal applied to counter 208 so long as it is not disabled by the output signal minimum of multiplexer switch 204 of FIG. 9 corresponding to the sample signal Sa not exceeding the minimum threshold signal. The preset binary state from which the counter 218 begins counting upon each sequence is such that once the minimum number of valid samples Sa during a sequence is exceeded the most significant bit output lead D will be high. When high, this lead enables an AND gate 219 to pass the leading edge of the signal appearing on the bottommost output lead 210 (6) at the end of each sequence to its output to act as an advance sequence signal AS to advance the zero crossing sequence selector 186 to the next sequence. If a minimum of two valid signals during each six sample sequence were desired, then a preset state of "0110" for counter 218 will ensure that the output is high for enabling AND gate 219 only after it has been incremented two counts, which will occur only if at least two signal samples Sa exceed the minimum threshold signal resulting in the absence of a DISABLE signal to counter 218 during at least two clock pulses. Even if all six samples Sa of a sequence are valid, the output lead D remains high after the first two samples so as to enable AND gate 219 to generate the AS signal to advance the sequence to the next one.

The AS signal at the output of AND gate 219 is applied to a sequence counter 220 of zero crossing sequence selector 186, having m output leads sequentially energized during a count, as shown in FIG. 10a. The AS signal is applied via the first input of a two input AND gate 222 which is enabled so long as the sequence counter is not in the last or mth sequence (m output lead energized) by virtue of the interconnection of the m output lead for counter 220 with the other input to AND gate 222 via an inverter 224. Once the last sequence m is initiated the sequence of counter 220 cannot be advanced via its clock input because of the high level signal on its m output lead (constituting the MS signal previously alluded to) in order to permit the samples totals comparison to be made as in the case just described for the sample counter 208. Each counting cycle for sequence counter 220 is initialized to a fixed state, for example energizing the topmost output lead, through a signal applied to its present input Pre via an OR gate 226 whose two inputs are derived from the EOC and MAX signals previously alluded to. Thus, each matrix initiation is made with the first row or sequence upon the occurrence of either an end of cycle or magnitude threshold exceeded as designated by the aforementioned signals respectively. Once the last or mth row is initiated, the high level MS signal appearing on the mth output lead of sequence counter 220 not only disables AND gate 214 via inverter 216 as previously addressed, but also enables an AND gate 228 of sample selector 185 to pass the AS signal to its output which acts as a check total signal CT to initiate the samples totals comparison performed by the maximum samples totals detector 188.

Figure 11A:
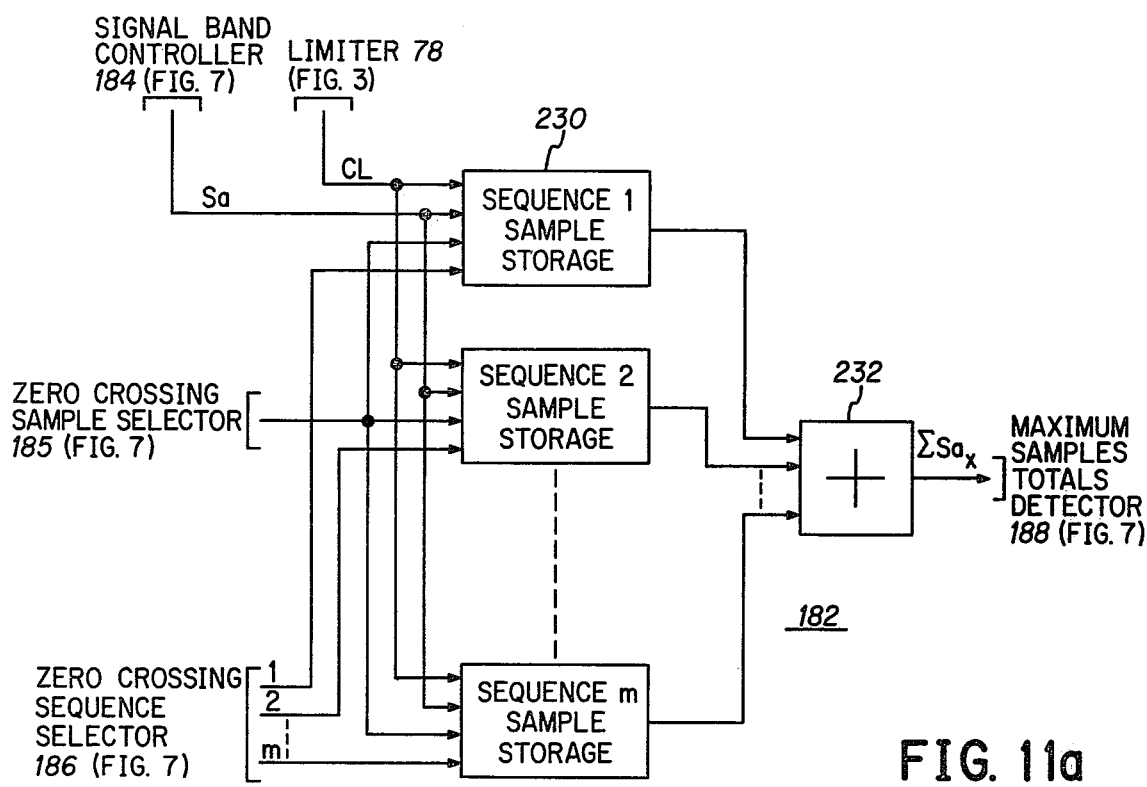
FIGS. 11a and 11b depict in detail the zero crossing sample circuits of FIG. 7.
Figure 11B:
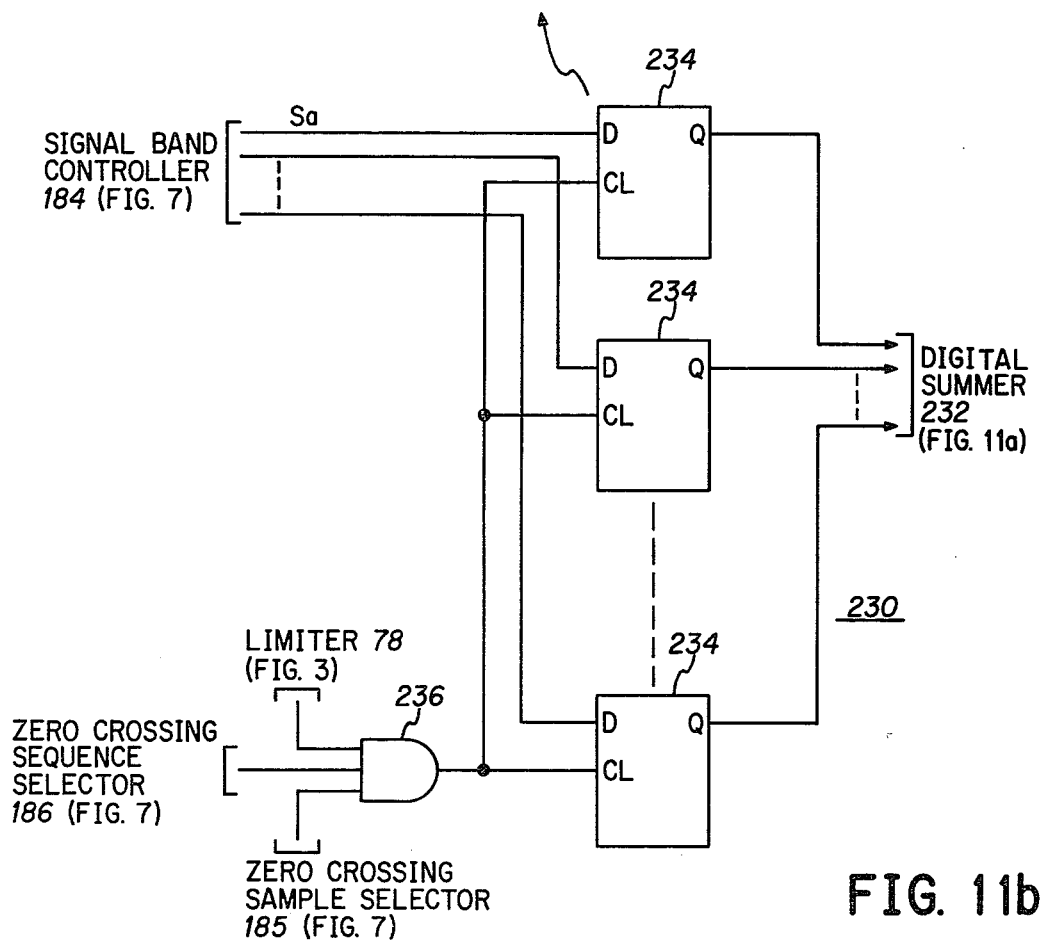
Figure 12:
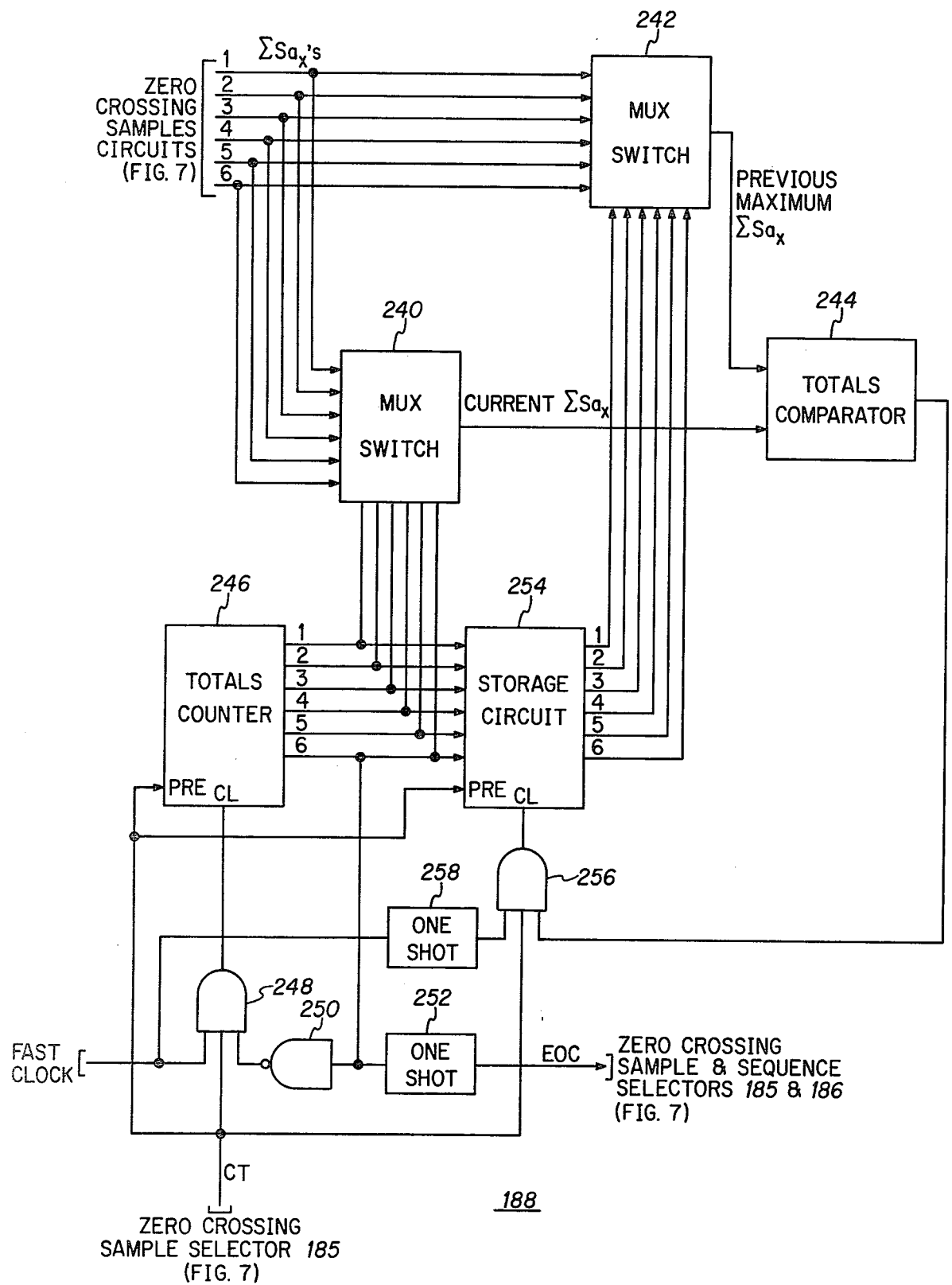
FIG. 12 delineates the maximum samples totals detector of FIG. 7.

Before proceeding to describe the detector 188 in conjunction with FIG. 12, the zero crossing samples circuits 182 will be detailed in conjunction with FIGS. 11a and 11b. As shown in FIG. 11a, each zero crossing samples circuit 182 comprises m sequence sample storage circuits 230, there being an individual one for each of the sequences for storing the associated signal sample Sa which is clocked thereinto under the control of a clock signal derived from the 60 hertz AC signal such as the output of limiter 78 of FIG. 2 as was the case for the counters of FIG. 10b. All of the sequence sample storage circuits 230 within a given samples circuit 182 are simultaneously enabled to receive the sample signal Sa as applied thereto by the associated output from samples counter 208 while only one of the sample circuits 230 is enabled to receive the sample Sa corresponding to its associated sequence by the output of sequence counter 220, with each one of the leads being connected to a different one of the sequence sample storage circuits 230. The outputs of the sample storage circuits 230 are all connected to a digital summer 232 wherein they are totalized to provide at its output the total $\Sigma Sa$ corresponding to its associated zero crossing once the matrix of FIG. 6 is complete.

As depicted in FIG. 11b, each sequence sample storage circuit 230 comprises a plurality of D type flip-flops 234, with each one thereof storing a different one of the parallel bits corresponding to the sample signal Sa which are respectively applied to their D inputs. The Q outputs of flip-flops 234 are connected to digital summer 232 to provide the digital inputs thereto. The new bits constituting each signal sample Sa are clocked into the D flip-flops 234 by a signal at the output of an AND gate 236 whose three inputs correspond to the clock input of FIG. 11a and the appropriate output leads from sample counter 208 and sequence counter 220.

Returning now to the maximum samples totals detector 188, it will be seen in FIG. 12 that the totals outputs $\Sigma Sa$ of digital summer 232 for all of the samples circuits 182 are applied as inputs to two multiplexer switches 240 and 242 whose outputs are applied to a totals comparator circuit 244. The comparison operation is performed by comparing sequentially each current crossing total ΣSa appearing at the output of multiplexer 240 with the previous maximum crossing total detected appearing at the output of multiplexer 242 in the totals comparator 244. If the current total ΣSa under examination exceeds the previous maximum stored in multiplexer 242, then the output of multiplexer 242 is altered to conform thereto. However, if the current total ΣSa is less than the previous maximum value stored in multiplexer 242, the output of multiplexer 242 remains unchanged.

Multiplexer 240 is enabled to switch the six crossing totals ΣSa's applied thereto to its output sequentially under the control of a totals counter 246 whose six output leads, which are connected as inputs to multiplexer 240, are sequentially energized during each complete counting cycle. Counter 246 is initialized so that each cycle begins with its topmost output lead energized by the application to its preset input PRE of the check totals signal CT generated at the output of AND gate 228 of FIG. 10b. The signal CT also partially enables an AND gate 248 to pass clock pulses derived from a very fast clock (vis-a-vis the 60 hertz AC signal) to counter 246 to advance its count. A very fast clock ensures the completion of the totals comparison within the 60 hertz AC half-cycle in which it is begun so that the sample Sa at the end of that half-cycle can be entered in a new matrix (first row and column) in order to maintain correspondence between the zero crossing sample location within a sequence and its placement into the appropriate column of the matrix. These fast clock pulses are passed so long as the totals counter 246 has not yet attained its maximum count of six, by virtue of the interconnection of its bottommost output lead as a third input to AND gate 248 via an inverter 250. Once counter 246 achieves its maximum count of 6, the energization of its bottommost lead triggers a one-shot 252 which provides the EOC signal previously alluded to designating that the end of a cycle has occurred and permitting the formulation of a new matrix of FIG. 6.

The output leads of counter 246 are also connected as inputs to a storage circuit 254 whose outputs are connected as control inputs to multiplexer 242 to select which of the crossing totals is to appear at its output. Storage circuit 254 is preset by the CT signal to a fixed state so that its topmost lead corresponding to the first crossing total is energized at the beginning of each counting cycle for counter 246. Thereafter, its output is allowed to change to the input applied from counter 246 only upon the generation of a clock pulse at the output of an AND gate 256 having three inputs. One input is connected to apply the CT signal to permit a change only when the apparatus is in a check totals mode. The clock pulse applied to counter 246 is applied as a second input to AND gate 256, for strobing the input data of storage circuit 254 to its output, via a one-shot 258 which avoids a race condition between storage circuit 254 and totals counter 246. The third input to AND gate 256 is derived from the output of totals comparator 244 which will be high to enable a clock pulse to pass through AND gate 256 only when the input for the current ΣSa to totals comparator 244 from multiplexer 240 exceeds the other input (previous maximum ΣSa) from multiplexer 242.

As the foregoing detailed description demonstrates, the invention herein affords a digital means for deriving the baud timing from an available AC signal while resolving any zero crossing ambiguities which appertain thereto. Although the repetitive zero crossings of the AC signal provide a convenient means for tracking the AC half-cycles, it will be readily apparent that any periodic event such as the apex of the AC half-cycle could just as well be employed. Since other modifications to the preferred embodiment may also be made without departing from the scope and spirit of the invention, the detailed description is intended to be exemplary and not circumscriptive of the invention as it will now be claimed hereinbelow.

What is claimed is:

1. Means for providing a baud timing signal from an AC signal having n half-cycles during each baud period, for use in demodulating a carrier signal bearing digital information via some predetermined variation in a characteristic of the carrier signal during each baud period, comprising:
    means for converting the carrier signal characteristic variation to a DC signal indicative of the digital data;
    means for sampling the DC signal at the same point during each half-cycle of the AC signal;
    means for summing the samples corresponding to the same half-cycle of the AC signal within each sequence of AC signal half-cycles occurring over successive baud periods, there being n such samples totals;
    means for identifying the largest one of said n samples totals, and
    means for synchronizing the baud timing signal to the AC half-cycle yielding said largest samples total.

2. The baud timing signal means of claim 1 wherein the sampling point for each half-cycle of the AC signal corresponds to a zero crossing.

3. The baud timing signal means of claim 2 wherein the samples are obtained by periodically integrating the DC signal over each AC signal half-cycle and summing each integral with the previous n−1 integrals.

4. The baud timing signal means of claim 3 including means for periodically updating the samples and determining the largest total thereamong and further including means for synchronizing the baud timing signal to any zero crossing at least twice which consecutively yields the largest samples total.

5. The baud timing signal means of claim 4 further including means for excluding any sample which does not exceed some minimum threshold value.

6. The baud timing signal means of claim 5 further including means for rejecting all previous samples whenever a sample exceeds some maximum threshold value.

7. The baud timing signal means of claims 3 or 4 wherein the AC signal is derived from an electric power system over which the carrier signal is transmitted.

8. A method for providing a baud timing signal from an AC signal having n half-cycles during each baud period, for use in demodulating a carrier signal bearing digital information via some predetermined variation in a characteristic of the carrier signal during each baud period, comprising:
    converting the carrier signal characteristic variation to a DC signal indicative of the digital data;
    sampling the DC signal at the same point during each half-cycle of the AC signal;
    summing the samples corresponding to the same half-cycle of the AC signal within each sequence of AC signal half-cycles occurring over successive baud periods, there being n such samples totals;

identifying the largest one of said n samples totals, and synchronizing the baud timing signal to the AC half-cycle yielding said largest samples total.

9. The baud timing signal method of claim 8 wherein the sampling point for each half-cycle of the AC signal corresponds to a zero crossing.

10. The baud timing signal method of claim 9 wherein the samples are obtained by periodically integrating the DC signal over each AC signal half-cycle and summing each integral with the previous n−1 integrals.

11. The baud timing signal method of claim 10 including periodically updating the samples and determining the largest total thereamong and further including synchronizing the baud timing signal to any zero crossing which at least twice consecutively yields the largest samples total.

12. The baud timing signal method of claim 9 further including excluding any sample which does not exceed some minimum threshold value.

13. The baud timing signal method of claim 12 further including rejecting all previous samples whenever a sample exceeds some maximum threshold value.

14. The baud timing signal method of claims 10 or 11 wherein the AC signal is derived from an electric power system over which the carrier signal is transmitted.

15. A digital data receiver in which the baud timing signal is derived from an AC signal having n half-cycles during each baud period, the data being borne by a carrier having a characteristic which is varied in a predetermined manner during each baud period in accordance with the digital data, comprising:

means for converting the carrier signal characteristic variation to a DC signal indicative of the data;

means for sampling the DC signal at the same point during each half-cycle of the AC signal;

means for summing the samples corresponding to the same half-cycle of the AC signal within each sequence of AC signal half-cycles occurring over successive baud periods, there being n such samples totals;

means for identifying the largest one of said n samples totals;

means for synchronizing the baud timing signal to the AC half-cycle yielding said largest samples total, and means for detecting the data from the DC signal employing the synchronized baud timing signal.

16. The baud timing signal means of claim 15 wherein the sampling point for each half-cycle of the AC signal corresponds to a zero crossing.

17. The baud timing signal means of claim 16 wherein the samples are obtained by periodically integrating the DC signal over each AC signal half-cycle and summing each integral with the previous n−1 integrals.

18. The baud time signal means of claim 17 including means for periodically updating the samples and determining the largest total thereamong and further including means for synchronizing the baud timing signal to any zero crossing which at least twice consecutively yields the largest samples total.

19. The baud timing signal means of claims 17 or 18 wherein the AC signal is derived from an electric power system over which the carrier signal is transmitted.

* * * * *